United States Patent [19]

Romanov et al.

[11] 4,293,273
[45] Oct. 6, 1981

[54] AXIAL-FLOW REVERSIBLE TURBINE

[76] Inventors: Viktor I. Romanov, Oktyabrsky prospekt, 38, kv. 6; Felix I. Kirzner, prospekt Lenina, 69, kv. 85; Yakov K. Soroka, ulitsa Dekabristov, 38/2, kv. 4, all of Nikolaev, U.S.S.R.

[21] Appl. No.: 958,568

[22] Filed: Nov. 3, 1978

Related U.S. Application Data

[63] Continuation of Ser. No. 746,150, Nov. 30, 1976, Pat. No. 4,124,329.

[51] Int. Cl.$^3$ .............................................. F01D 1/30
[52] U.S. Cl. ...................................... 415/78; 415/85; 415/122 R
[58] Field of Search .................................... 415/78, 85

[56] References Cited

U.S. PATENT DOCUMENTS

| | | | |
|---|---|---|---|
| 712,424 | 10/1902 | Tyzack | 415/78 |
| 788,925 | 5/1905 | Masters | 415/78 |
| 1,316,974 | 9/1919 | Ravenna | 415/78 |
| 3,286,983 | 11/1966 | Scheper, Jr. | 415/153 R |
| 3,802,797 | 4/1974 | Bintz et al. | 415/153 R |

Primary Examiner—Leonard E. Smith
Attorney, Agent, or Firm—Haseltine & Lake

[57] ABSTRACT

An axial-flow reversible turbine comprises a nozzle assembly and a wheel rotor mounted consecutively in the direction of the flow of the working medium and provided with two-section blades. One section of said blades forms the flow duct of the direct-rotating turbine and the other section, the flow duct of the counter-rotating turbine. The flow duct of the direct-rotating turbine incorporates a valve in the form of variable-incidence airfoil vanes intended to deny the access of the working medium into said duct. The inside diameter of the flow duct of the counter-rotating turbine is larger than the outside diameter of the flow duct of the direct-rotating turbine. The gas flow ducts of the direct- and counter-rotating turbines communicate with each other through a cylindrical bushing with ports. Said bushing is installed coaxially with the wheel rotor at the inlet of the flow into the flow duct before the nozzle assembly and its inside diameter is substantially equal to the outside diameter of the flow duct of the direct-rotating turbine. The bushing is provided with a band arranged along its periphery and being sufficiently wide for overlapping the ports. The band has a device for moving it radially to at least two fixed positions in one of which it fits around the outside circumference of the gas flow duct of the counter-rotating turbine and in the other position it fits around the outside circumference of the gas flow duct of the direct-rotating turbine.

3 Claims, 6 Drawing Figures

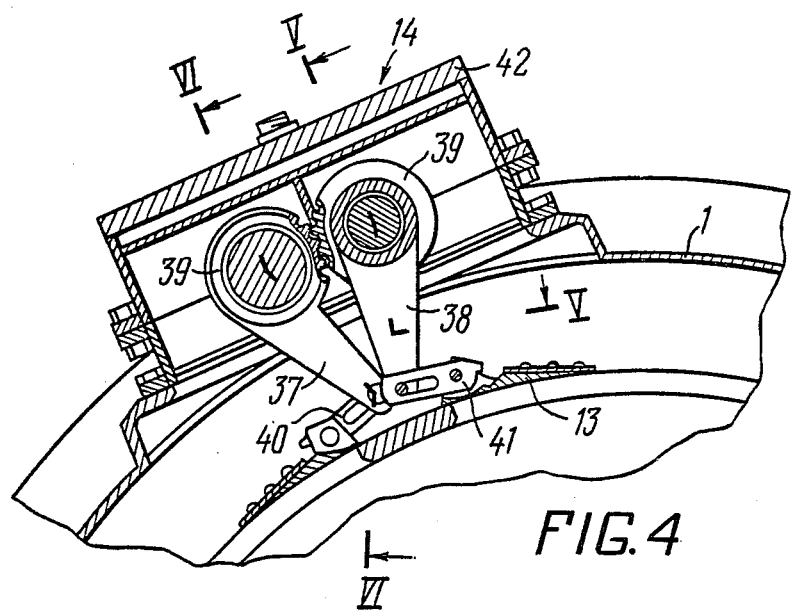
FIG. 4
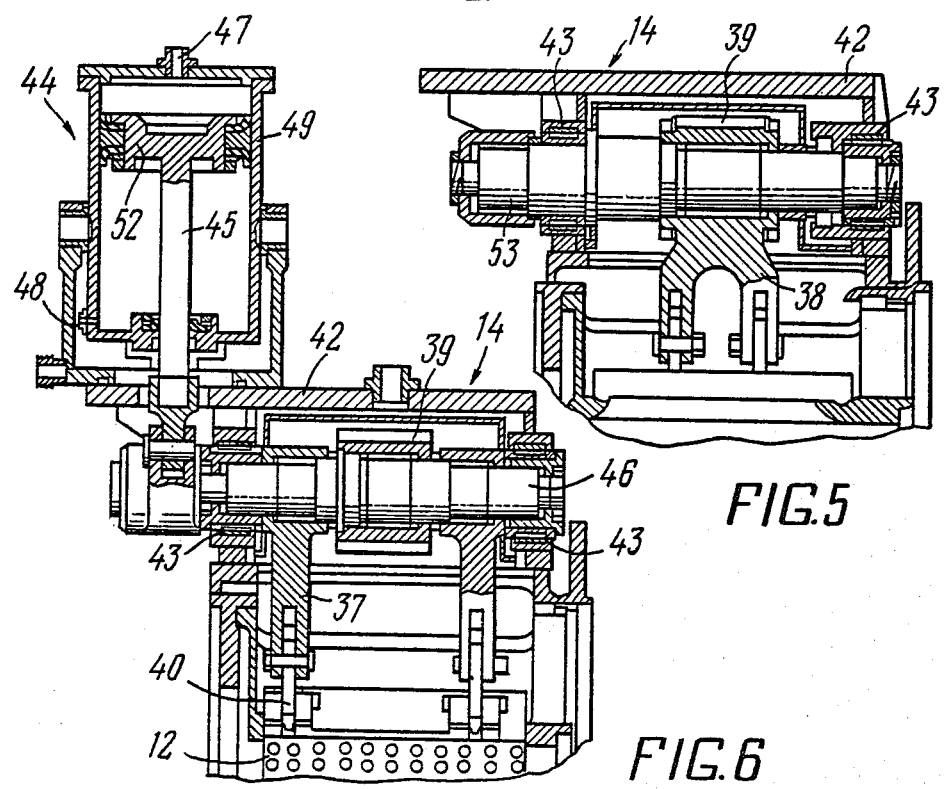
FIG. 5
FIG. 6

AXIAL-FLOW REVERSIBLE TURBINE

This is a continuation of application Ser. No. 746,150 filed Nov. 30, 1976, now U.S. Pat. No. 4,124,329.

BACKGROUND OF THE INVENTION

The present invention relates to the field of gas-turbine installations and more particularly it relates to axial-flow reversible turbines.

Most successfully the present invention can be employed in ship-building and in two-circuit turbojet aircraft engines.

The introduction of gas turbines into transport machine building and, particularly, into ship-building has brought about a critical problem of reversibility, i.e. the possibility of obtaining forward and reverse rotation in a single installation. The existing engineering solutions aimed at reversing the rotation of propellers, e.g. variable-pitch propellers, reversible hydraulic reduction gears, etc. are complicated, large and insufficiently maneuverable devices. These disadvantages become most conspicuous in gas-turbine installations since they are very high, compact and highly maneuverable units.

This has led to a natural consequence, i.e. to the use of a reversible turbine as the most obvious device capable of ensuring reversibility.

The steam turbines are provided with a separate counter-rotating turbine; however, the wheel rotors of the direct-rotating and counter-rotating turbines are located in separate casings which makes such a layout cumbersome and little adapted for use in gas turbine installations.

As a result, the attempts to solve the problem of reversibility went along the course of devising single-casing two-circuit turbines with two-section blades, each circuit being constituted by a direct-rotating or counter-rotating gas-flow duct with valve devices intended to deny the access of the working medium to the corresponding gas-flow duct.

Known in the previous art is an axial-flow reversible turbine manufactured by General Electric.

The casing of this General Electric turbine accommodates a nozzle assembly and a wheel rotor mounted successively in the direction of the flow of the working medium and provided with two-section blades. One section of the blades forms the duct for the flow of the working medium ensuring direct rotation of the turbine. The flow duct of the General Electric turbine of the direct-rotating turbine incorporates a valve in the form of variable-incidence vanes intended to shut off the admission of the working medium into said duct. The variable-incidence vanes are arranged before the upper section rotor blades in the direction of the flow of the working medium.

The counter-rotating flow duct accommodates variable-incidence vanes which deny the access of the working medium to the lower section of the counter-rotating blades. In this case the rotation axis of the counter-rotating blades coincides with that of the direct-rotating blades.

In the reversible turbine running at the direct-rotating mode the positions of the main turbine elements of this General Electric turbine are as follows:

(a) the variable-incidence vanes of the nozzle assembly in the gas flow duct of the direct-rotating turbine are in the "OPEN" or "TURBINE MODE" position and admit the working medium to the wheel rotor blades of the direct-rotating stage; at the same time the variable-incidence vanes of the nozzle assembly in the gas-flow duct of the counter-rotating stage are in the "CLOSED" position and the working medium is not admitted to the wheel rotor blades of the counter-rotating stage except for the leaks, i.e. that proportion of the entire flow which penetrates through the radial and peripheral clearances of the variable-incidence vanes in the "CLOSED" position.

Meanwhile, the direct-rotating turbine blades rotating with the edges forward consume a fraction of the work of the direct-rotating stage, which is in the "TURBINE MODE". This fraction is referred to as "VENTILATION LOSSES" while the corresponding "TURBINE MODE" is a "VENTILATION MODE".

When the reversible turbine runs at the counter-rotating duty the variable-incidence vanes of the nozzle assembly in the gasflow duct of the direct-rotating stage occupy the "CLOSED" position and deny the access of the working medium to the wheel rotor blades of the direct-rotating stage in which case the variable-incidence vanes of the nozzle assembly of the counter-rotating stage are in the "OPEN" position and the working medium is admitted to the wheel rotor blades of the counter-rotating stage. The wheel rotor blades of the direct-rotating stage are in the "VENTILATION MODE" and consume a fraction of the work done by the counter-rotating stage which is in the "TURBINE MODE".

In the single-stage embodiment of the General Electric reversible turbine the action of wide temperature differences calls for high tip speeds of the wheel rotors which raises sharply the ventilation losses between the types of the blades and the surrounding casing of the counter-rotating turbine in spite of the fact that the outside diameter of the counter-rotating gas flow duct is substantially equal to the inside diameter of the direct-rotating gas flow duct.

High tip speeds of the wheel rotors impose heavy stresses on the rotor blades. These stresses can be relieved by reducing the areas through the direct-rotating and counter-rotating gas flow ducts. This, in turn, will increase the exit velocities of the working medium which increase the pressure losses after the wheel rotors thus reducing the efficiency of the reversible turbine.

The General Electric reversible turbine has a low efficiency which is caused also by the fact that the inside diameter of the gas flow duct of the direct-rotating stage is substantially equal to the outside diameter of the gas flow duct of the counter-rotating stage, and since the modern gas-turbine engines are characterized by the need of withstanding big temperature differences or enthalpy higher than that withstandable in one stage of a high-efficiency turbine, these present considerable difficulty in developing a multi-stage direct-rotating turbine.

These difficulties arise because the provision of a multiple-stage direct-rotating turbine would call for the provision of an equal number of stages of a counter-rotating turbine and would result in an unduly sharp increases of ventilation losses which reduce the turbine efficiency.

In an alternative case it would be necessary, without increasing the number of stages of the counter-rotating turbine, to increase sharply the dimensions of its blades which is not rational either.

Besides, the efficiency of the known reversible turbine is also reduced because of a sudden expansion of the gas flow duct at the entrance of the working medium into the direct-rotating stage which leads to vortex generation and additional hydraulic losses. The sudden expansion of the gas flow duct is caused by the alignment of the valves in the form of variable-incidence airfoil vanes with the nozzle assemblies.

The variable nozzle assemblies are characterized by radial clearances which allow the working medium to leak into the counter-rotating gas flow duct with the turbine running at the direct-rotating duty; this reduces considerably the efficiency of the direct-rotating stage.

An object of the present invention is to provide a reversible gas turbine of a higher efficiency by introducing a smooth and pressuretight gas flow duct of the direct-rotating turbine and by creating a multiple-stage direct-rotating turbine ensuring the action of great temperature differences.

Another object of the present invention is to provide a reversible gas turbine with a higher specific power.

SUMMARY OF THE INVENTION

In accordance with these and other objects, the essence of the present invention consists in providing an axial-flow reversible turbine whose casing accommodates a nozzle assembly and a wheel rotor mounted consecutively in the direction of the flow of the working medium and provided with two-section blades, one of said sections forming the gas flow duct of the direct-rotating turbine incorporating a valve in the form of variable-incidence airfoil vanes to shut off the access of the working medium into said duct and communicating with the gas-flow duct of a counter-rotating turbine formed by the other section of the blades wherein, according to the invention the inside diameter of the gas-flow duct of the counter-rotating turbine is larger than the outside diameter of the gas-flow duct of the direct-rotating turbine, the gas-flow ducts are in communication with each other through a cylindrical bushing with ports, said bushing being arranged coaxially with the wheel rotor at the entrance into the gas-flow duct before the nozzle assembly and having an inside diameter which is substantially equal to the outside diameter of the gas-flow duct of the direct-rotating turbine and wherein said turbine has a band which is located around the periphery of the cylindrical bushing, is sufficiently wide to overlap the ports and has a device for moving it radially to at least two fixed positions in one of which said band is located around the outside circumference of the gas-flow duct of the counter-rotating turbine whereas in the other position it is located around the outside circumference of the gas-flow duct of the direct-rotating turbine.

This design of the axial-flow reversible turbine provides a smooth and pressure direct-rotating gas-flow duct. It ensures a minimum leakage of the working medium into the counter-rotating gas-flow duct during direct-rotating operation and reduces hydraulic losses, thus eventually stepping up the turbine efficiency.

A substantial equality between the inside diameter of the counter-rotating gas-flow duct and the outside diameter of the direct-rotating gas-flow duct makes it possible to devise a multiple-stage direct-rotating turbine utilization of practically any pressure or temperature differences characterizing the modern gas-turbine engines at the highest possible efficiencies thus providing for developing a reversible gas turbine with high efficiency.

It is expedient that the gas flow duct of the direct-rotating turbine should incorporate at least one single-section additional stage mounted before the nozzle assembly with two-section blades, the maximum number of additional stages not exceeding the number of stages derived from the following relation:

$$i_{max} = A\overline{N}^3 + B\overline{N}^2 + C\overline{N} + D,$$

wherein $A = -2000$; $B = 2000$; $C = -690$; $D = 91$;

$$\overline{N} = \frac{N \text{ counter-rotating turbine}}{N \text{ direct-rotating turbine}}$$

where:
$i_{max}$ is the maximum number of additional single-section stages installed before the nozzle apparatus fitted with double-section blades.
$N =$ is the power developed by the turbine.

$$\overline{N} = \frac{N \text{ of the counter-rotating turbine}}{N \text{ of the direct-rotating turbine}}$$

is the relative power of the counter-rotating turbine.

Making the direct-rotating turbine with a multiple number of stages at a present temperature difference allows the turbine speed to be reduced which decreases the tip speeds and, consequently, gives a substantial reduction in ventilation losses from the rotor blades of the counter-rotating turbine during operation at the direct-rotating duty.

An increased number of stages in the direct-rotating turbine and the resultant reduction of tip speeds brings about such a occurrence in which the reduction of the tip speed decreases the efficiency of the counter-rotating turbine; however, this efficiency must not be lower than a certain limit which ensures the present relative power of the counter-rotating turbine. This factor limits the number of stages of the direct-rotating turbine.

A reduction of turbine speed reduces substantially the stresses in the rotor blades which makes it possible to increase the area through the gas flow duct of the direct-rotating turbine and, consequently, to reduce considerably the pressure losses after the wheel rotor by reducing the exit velocities of the working medium.

It is recommended that the rotor blades in the gas-flow duct of the counter-rotating turbine should have such a profile in which the direction of the trailing edge should coincide with the direction of the flow exit angle and the leading edge should be turned in such a manner that the matching of the leading and trailing edges would create a convex surface whose convexity is directed in the direction of the direct-rotating side.

This design of the rotor blades in the counter-rotating turbine reduces ventilation losses during operation of the reversible turbine at the direct-rotating duty due to the smoothness of flow around the leading edges of the blades of the counter-rotating turbine working at the ventilation duty. It has been established by experiments that this shape of the rotor blades reduces ventilation losses 2-3 times as compared with the known blades of the counter-rotating turbines.

It is good practice if the device for radial movement of the band is located on the external surface of the casing and has two levers, each connected by one end with the end of the band, the other ends of the levers being interconnected with each other by a gear drive.

This design of the device for moving the band ensures its large radial travel.

The axial-flow reversible turbine according to the invention is a highly efficient light and small apparatus. Due to reversibility its dimensions and weight are only 10% greater than those of the nonreversible turbines. The axial-flow turbine according to the invention can be used in gas turbine installations of practically any specific power, it is highly manoeuvrable and, due to the new features of design, its efficiency may rise above 30% which places the reversible turbine according to the invention among the best reversible apparatuses now in existence.

BRIEF DESCRIPTION OF THE DRAWINGS

Other objects and advantages of the present invention will become apparent from its embodiment described below and from the accompanying drawings, in which:

FIG. 4 is a section taken along line IV—IV in FIG. 2 across the levers of the device for the radial movement of the band;

FIG. 5 is a section taken along line V—V in FIG. 4;

FIG. 6 is a section taken along line VI—VI in FIG. 4.

DESCRIPTION OF THE PREFERRED EMBODIMENTS

Figure 1:
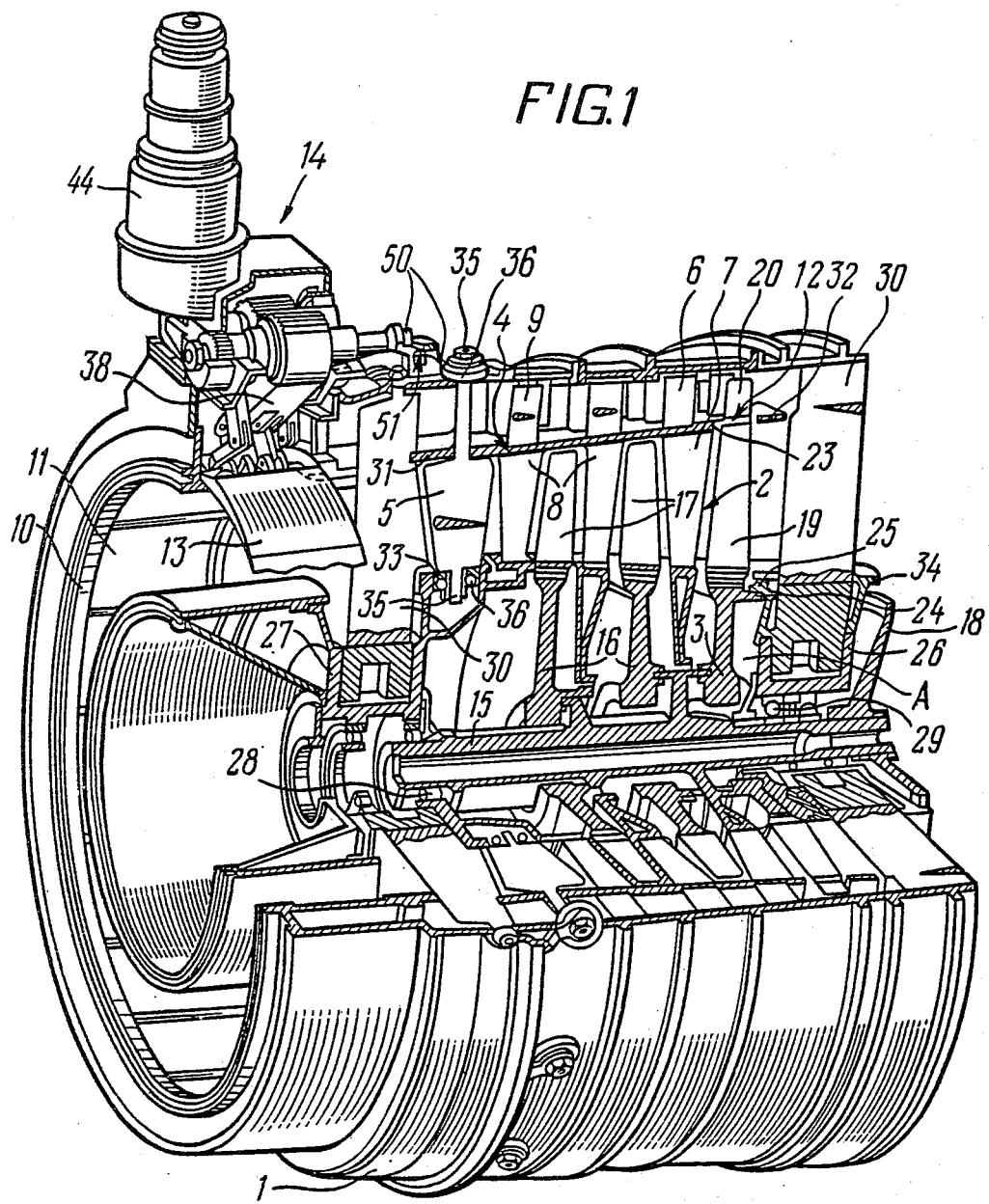
FIG. 1 is an isometric view of the reversible turbine according to the invention with a partial cutout.

The axial-flow reversible turbine according to the invention intended for installation on a ship or vessel to ensure ahead and astern running comprises a casing 1 (FIG. 1) which accommodates a nozzle assembly 2 and a wheel rotor 3, both being installed consecutively in the direction of the flow of the working medium and provided with two-section blades, one of said sections forming the gas-flow duct of the direct-rotating turbine and the other section, the gas flow duct of the counter-rotating turbine.

The gas-flow duct of the direct-rotating turbine has two additional single-section stages 4 mounted before the nozzle assembly 2 with two-section blades.

The gas-flow duct of the direct-rotating turbine accommodates a valve in the form of variable-incidence airfoil vanes 5 intended to deny access of the working medium into gas-flow duct.

The gas-flow duct of the counter-rotating turbine is formed by the upper section of the two-section blades. The nozzle assembly of the counter-rotating turbine is constituted by fixed vanes 6; the nozzle assembly of the direct-rotating turbine is formed by fixed vanes 7. Two single-section nozzle assemblies 8 of the additional stages 4 of the direct-rotating turbine are fixed in the casing 1 by means of airfoil struts 9 arranged in the gas-flow duct of the counter-rotating turbine.

The access of the working medium to the counter-rotating turbine is denied by a cylindrical bushing 10 (FIG. 2) with ports 11, said bushing being located in the gas-flow duct of the counter-rotating turbine coaxially with the wheel rotor 12 (FIG. 1) of the counter-rotating turbine. The inside diameter of the cylindrical bushing 10 is substantially equal to the outside diameter of the gas-flow duct of the direct-rotating turbine. Arranged along the periphery of the bushing 10 (FIG. 2) is a band 13 whose width is sufficient for overlapping the ports 11. The band 13 is provided with a device 14 for moving it radially to two fixed positions.

The rotor of the axial-flow reversible turbine consists of a shaft 15 (FIG. 1), a wheel rotor 3 with two-section blades, two wheel rotors 16 of the additional single-section stages 4 with blades 17 mounted before the wheel rotor 3 with two-section blades, and a coupling 18 intended to connect the turbine rotor with the reduction gear (not shown in the drawing). The wheel rotors 3 and 16 and the shaft 15 are interconnected into a single integral unit by pins (not shown in the drawing).

Figure 3:
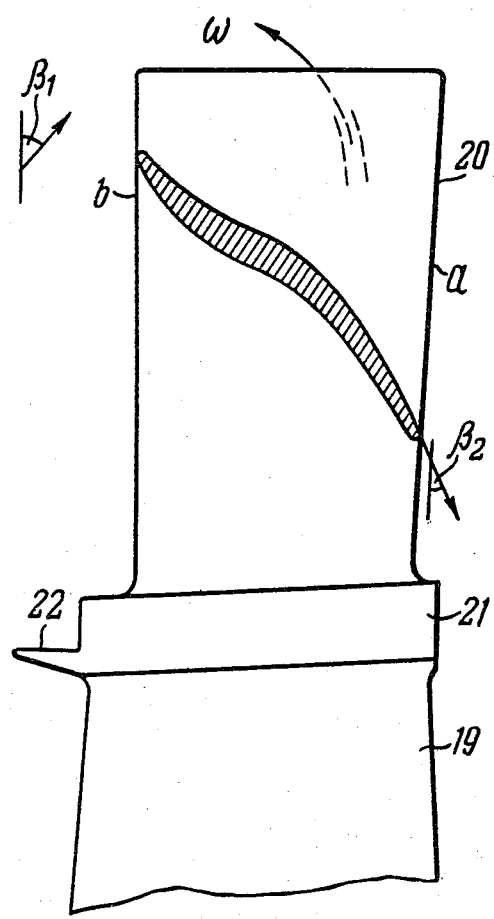
FIG. 3 shows the profile of the turbine rotor blade ensuring reverse rotation.

The two-section blades of the wheel rotor 3 consist of direct-rotating blades 19 and counter-rotating blades 20. In FIG. 3, $B_1$ is the flow entry angle; and $B_2$ is the flow exit angle. Each direct-rotating blade 19 has a flat 21 (FIG. 3) mounting one or more counter-rotating blades 20 of a S-shaped profile; the direction of the trailing edges a of said blades coincides with the flow exit angle $\beta_2$ and their leading edge b is turned so that the junction of the trailing and leading edges a and b forms a convex surface whose convexity is directed along narrow W, i.e., direct sense of rotation. FIG. 3 shows-$B_1$ is a gas flow angle of entrance to the counter-rotating blades. The front face of flat 21 is provided with collar 22 which, together with knife edges 23 (FIG. 1) of the nozzle assembly 2, forms a labyrinth seal which keeps the working medium from flowing out of the gas flow duct of the direct-rotating turbine into the gas flow duct of the counter-rotating turbine and back.

Fastened on the wheel rotor 3 is a labyrinth 24 which, together with the sealing cover 25 of the rear supporting rim 26 forms a labyrinth seal intended to keep air from leaking out of relief space A.

The wheel rotor of the reversible turbine is mounted in supporting rims, viz., rear rim 26 and front rim 27, on front roller bearing 28 and rear ball bearing 29. The forces of the turbine rotor are transmitted to the casing 1 through the struts 30 of the supporting rims 26 and 27. Said rims have direct-rotating and counter-rotating gas flow ducts. The counter-rotating duct is limited by the turbine casing 1 and by intermediate casings 31 and 32 which have cutouts for the passage of the struts 30. The direct-rotating duct is limited by the intermediate casings 31 and 32 and by housings 33 and 34. Located after the struts 30 of the front supporting rim 27 are variable-incidence airfoil vanes 5 whose journals 35 rest on the bearings 36 which are fixed in the casing 1 and housing 33.

The device 14 for radial movement of the band 13 consists of a driving lever 37 and a driven lever 38 (FIG. 4) interconnected by gears 39 at one end while at the other end they are connected to the ends of the band 13 by shackles 40 and 41. The gears 39 are housed in a box 42 secured on the external surface of the casing 1. The gears 39 rotate on bearings 43 (FIG. 5) fastened in the box 42 of the device 14.

The device 14 is actuated by an air cylinder 44 (FIG. 6) whose rod 45 is connected with the shaft 46 of the driving lever 37. The device is controlled by compresses air delivered into the air cylinder 44 through pipe unions 47 and 48. The casing 49 of the air cylinder 44 is secured on the box 42 of the device 14.

Figure 2:
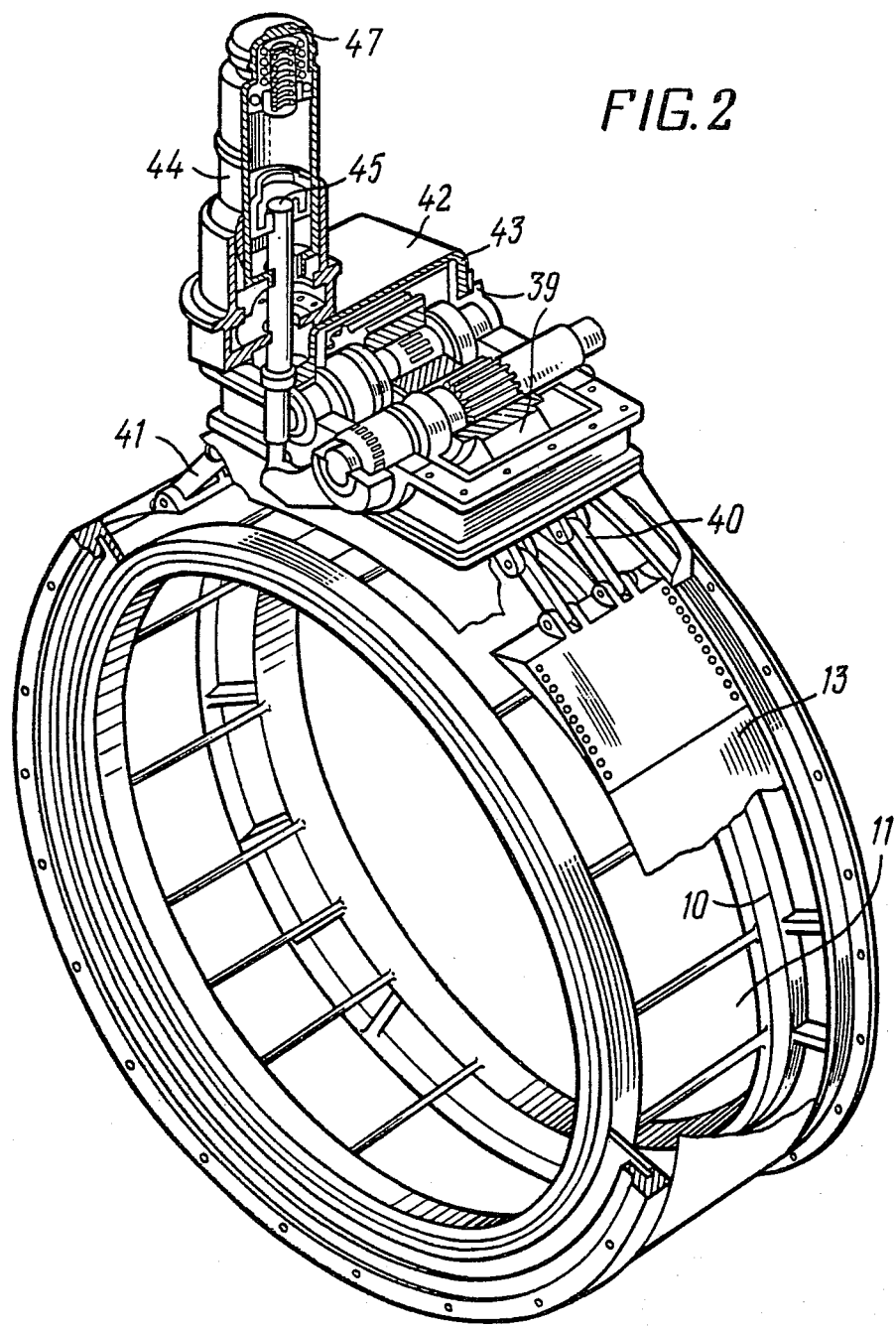
FIG. 2 is an isometric view of the cylindrical bushing with the band and a device for its radial movement, with a partial cutout.

In the reversible turbine illustrated schematically in FIG. 1 the band 13 and variable-incidence vanes 5 are controlled by one air cylinder 44. For this purpose the driven lever 38 of the device 14 is connected to the vanes 5 with the aid of levers 50 and a swivelling ring 51. The entire control system is designed so that the opening of the ports 11 of the cylindrical bushing 10, i.e. the upward movement of the band 13 turns the vanes 5 to close the gas-flow duct of the direct-rotating turbine whereas the closing of the ports 11 of the bushing 10, i.e. the downward movement of the band 13 turns the vanes 5 to open the gas-flow duct of the direct-rotating turbine. Theoretically, however, it is possible to provide separate control of the radial movement of the band 13 and of the turning of the airfoil vanes 5.

Ahead operation of vessel

During ahead running of a vessel the useful power is developed by the direct-rotating turbine. For this purpose the working medium must enter the gas-flow duct of the direct-rotating turbine whereas the duct of the counter-rotating turbine must be closed. With this purpose in view the actuating air is delivered through the pipe union 47 (FIG. 6) into the air cylinder 44. The piston 52 of the air cylinder 44 goes down and its rod 45 rotates the shaft 46 of the driving lever 37 which, in turn, rotates the shaft 53 of the driven lever 38 via the gears 39. The levers 37 and 38 move the band 13 (FIG. 1) radially down and it comes to rest on the cylindrical bushing 10, closing the ports 11. The shaft 53 (FIG. 5) of the driven lever 38 (FIG. 1) turns the airfoil vanes 5 by a system of levers 50 and the swivelling ring 50 and said vanes open the flow duct of the direct-rotating turbine. The working medium enters the direct-rotating turbine, does useful work and propels the vessel ahead.

Astern operation of vessel

To ensure the astern operation of the vessel the working medium must be admitted into the gas-flow duct of the counter-rotating turbine whereas the duct of the direct-rotating turbine must be closed by the airfoil vanes 5. For this purpose the actuating air is delivered into the air cylinder 44 (FIG. 6) through the pipe union 48 and is discharged through the pipe union 47. The piston 52 of the air cylinder 44 moves upward and its rod 45 rotates the shaft 46 of the driving lever 37 which rotates the shaft 53 (FIG. 5) of the driven lever 38 via the gears 39. The levers 37 and 38 (FIG. 4) move the band 13 upward, it opens the ports 11 (FIG. 1) of the cylindrical bushing 10 and the working medium is admitted into the gas-flow duct of the counter-rotating turbine. Simultaneously the shaft 53 (FIG. 5) of the driven lever 38 turns the vanes 5 by a system of levers 50 (FIG. 1) and the swivelling ring 51 and said vanes close the duct of the direct-rotating turbine. The working medium does useful work in the counter-rotating turbine, changes the sense of rotation of the turbine rotor and, accordingly, of the ship's propeller thus ensuring astern operation of the vessel.

Maneuvering

Apart from prolonged ahead and astern operation the vessel may be called upon to perform a number of maneuvers for which purpose it becomes necessary to change the engine power including zero power ("Stop-Propeller") rating without changing the operating conditions of the working medium generator, and to perform reversals (changes in the direction of rotation of the propeller turbine rotor). The engine power can be changed without changing the operating conditions of the working medium generator as follows.

Let us assume that at the initial period of time the turbine installation runs at full power in the direct-rotating mode. In this case, as has been stated above, the variable-incidence airfoil vanes 5 are wide open, the working medium is admitted into the direct-rotating turbine, does useful work and ensures ahead operation of the vessel. The band 13 is in tight contact with the cylindrical bushing 10, closes the ports 11 and denies the access of the working medium into the flow duct of the counter-rotating turbine which at the moment runs in the ventilation mode.

As the airfoil vanes 5 close, this increases the throughput of the direct-rotating turbine and the vanes 5 start working in the throttling mode, thus reducing pressure of the working medium at the entrance into the flow duct of the direct-rotating turbine. This reduces the power of the direct-rotating turbine.

The excessive amount of the working medium (in our example we consider the constant flow rate of the working medium) enters the flow duct of the counter-rotating turbine through the ports 11 of the cylindrical bushing 10 because the device 14 will in this period move the band 13 part-way upward. This will increase considerably the ventilation losses of the counter-rotating turbine thus reducing the power of the direct-rotating turbine still more. This sets a part-power rating without changing the operating conditions of the working medium generator; working medium generator is a combination of the compressors, combustion chamber and compressor-driving turbines which generate a working medium with high-potential energy converted into rotation energy on the reversible turbine. During further turning of the vanes 5 in the closing direction and lifting of the band 13 the fractional power of direct rotation will diminish and it is possible to move the airfoil vanes 5 and the band 13 to such a position at which the moments developed by the direct-rotating and counter-rotating turbines become equal. This position will correspond to zero output power and the "Stop-Propeller" rating.

Further turning of the airfoil vanes 5 in the closing direction and further lifting of the band 13 will lead to the development of partial counter-rotating power up to the full counter-rotating power when the vanes 5 close completely the flow duct of the direct-rotating turbine and the band 13 comes to the uppermost position.

It must be noted that regardless of the operating conditions of the working medium generator it is possible to ensure such a relation between the turning angle of the airfoil vanes 5 and the radial movement of the band 13 at which the summary throughput of the direct- and counter-rotating turbines and their degrees of expansion will stay constant, i.e.

$G = G' + G'' = \text{Const}$;

$A_1 \times A' = A_2 \times A'' = \text{Const}$ wherein: $G$ = rate of flow of working medium through working medium generator;

$G'$ = rate of flow of working medium through direct-rotating turbine;

$G''$ = rate of flow of working medium through counter-rotating turbine;

$A_1$ = degree of throttling of working medium in variable-incidence vanes 5;

$A'$ = degree of expansion in direct-rotating turbine; degree of expansion is the ratio of turbine inlet pressure to turbine outlet pressure. Meant by the degree of throttling is the ratio of the pressure at an inlet to a certain portion of the gas flow duct to the pressure at the outlet therefrom.

$A_2$ = degree of throttling of working medium in cylindrical bushing 10;

$A''$ = degree of expansion in counter-rotating turbine.

If the above conditions are satisfied, the operation of the working medium generator will not be affected in any way.

Reversing is carried out in the same manner but without stopping the airfoil vanes 5 and band 13 in the intermediate positions and sufficiently fast, i.e. in 1–5 seconds.

We claim:

1. An axial-flow reversible turbine according to claim 1 having a casing; a nozzle assembly accommodated in said casing provided with two-section blades for controlling the rate of flow of the working medium through said turbine; a wheel rotor with two-section blades for converting the kinetic energy of the flow of the working medium into mechanical work, mounted in the direction of the flow of the working medium after said nozzle assembly, one section of said blades of said nozzle assembly and of said wheel rotor forming the flow duct of the direct-rotating turbine and the other section of said blades of said nozzle assembly and said wheel motor forming the flow duct of the counter turbine, the inside diameter of said flow duct of counter-rotating turbine being larger than outside diameter of said flow duct of direct rotating turbine, a valve in the form of variable-incidence airfoil vanes intended to deny the access of the working medium into said flow duct of the direct-rotating turbine; located in said casing at the entrance into said flow duct; a cylindrical bushing with ports for intercommunicating said flow ducts, installed in said casing coaxially with said wheel rotor at the entrance of the flow into said flow duct before said nozzle assembly and having an inside diameter which is substantially equal to outside diameter of said flow duct of direct rotating turbine of the entrance into said flow duct; a band which is sufficiently wide for overlapping said ports and arranged along the periphery of said bushing; a device for moving said band radially to at least two fixed positions, said device being installed on the external surface of said casing and connected with said band and comprising: at least one additional single-section stage located in said flow duct of the direct-rotating turbine and installed before said nozzle assembly, the maximum number of said additional stages not exceeding the number of stages obtained from the relation:

$$i_{max} = A\overline{N}^3 + B\overline{N}^2 + C\overline{N} + D$$

where
A = −2000
B = 2000
C = −690
D = 91

$$\overline{N} = \frac{N \text{ counter-rotating turbine}}{N \text{ direct-rotating turbine}}$$

2. An axial-flow reversible turbine according to claim 1 wherein said blades of said wheel rotor of the counter-rotating turbine have a S-shaped profile in which the direction of the trailing edge coincides with the direction of the flow exit angle and the leading edge is turned so that the junction of the leading and trailing edges forms a convex surface whose convexity points to the direct-rotating side.

3. An axial-flow reversible turbine according to claim 1 wherein said device for the radial movement of said band comprises two levers, i.e. the driving and driven ones; a gear drive for connecting said levers with each other; one end of each of said levers is connected to the end of said band whereas their other ends are interconnected by said gear drive.

* * * * *